(12) United States Patent
Song

(10) Patent No.: US 12,242,170 B1
(45) Date of Patent: Mar. 4, 2025

(54) FRAME ASSEMBLY FOR OPTICAL ACTUATOR WITH RAIL SHAFTS AND MANUFACTURING METHOD THEREOF

(71) Applicant: SM TECH CO., LTD, Hwaseong-si (KR)

(72) Inventor: Jaihyun Song, Hwaseong-si (KR)

(73) Assignee: SM TECH CO., LTD, Hwaseong-si (KR)

( * ) Notice: Subject to any disclaimer, the term of this patent is extended or adjusted under 35 U.S.C. 154(b) by 0 days.

(21) Appl. No.: 18/636,245

(22) Filed: Apr. 15, 2024

(30) Foreign Application Priority Data

Nov. 15, 2023 (KR) .......................... 10-2023-0158152

(51) Int. Cl.
*G03B 13/36* (2021.01)
*G03B 3/02* (2021.01)
*G03B 13/18* (2021.01)

(52) U.S. Cl.
CPC .............. *G03B 13/36* (2013.01); *G03B 3/02* (2013.01); *G03B 13/18* (2013.01); *G03B 2217/002* (2013.01)

(58) Field of Classification Search
CPC .......... G03B 13/36; G03B 3/02; G03B 13/18; G03B 2217/002; G03B 30/00; G03B 2205/0046; G03B 2205/0069; G03B 2205/0053; G03B 2205/0007; G03B 17/12; G03B 13/32; G03B 2205/0015; G03B 5/04; H04N 23/687; H04N 23/55; H04N 23/54; H04N 23/57; G02B 7/09; G02B 7/021; G02B 7/04; G02B 7/022; G02B 7/023; G02B 7/10; G02B 1/041; G02B 7/003
See application file for complete search history.

(56) References Cited

U.S. PATENT DOCUMENTS

| 2009/0067070 A1 * | 3/2009 | Mitani | G02B 7/02 |
| | | | 359/824 |
| 2015/0144278 A1 * | 5/2015 | Lin | B60J 1/2052 |
| | | | 160/368.1 |
| 2021/0373278 A1 * | 12/2021 | Kim | G02B 7/021 |
| 2022/0171157 A1 * | 6/2022 | Roh | G03B 30/00 |
| 2022/0210296 A1 * | 6/2022 | Bang | H04N 23/54 |

(Continued)

FOREIGN PATENT DOCUMENTS

| CN | 114815125 A | 7/2022 |
| CN | 116165761 A | 5/2023 |

(Continued)

*Primary Examiner* — Abdelaaziz Tissire
(74) *Attorney, Agent, or Firm* — Revolution IP, PLLC

(57) ABSTRACT

A frame assembly constitutes a base or a carrier of the optical actuator, and includes first and second rail shafts formed of a metal, and a frame formed by injecting a resin into a mold into which the first rail shaft and the second rail shaft are inserted. At least a part of each of the first rail shaft and the second rail shaft coming into contact with the ball is exposed through one surface of the frame, and a plurality of first shaft position alignment holes arranged in a longitudinal direction of the first rail shaft to expose the first rail shaft therethrough and a plurality of second shaft position alignment holes arranged in a longitudinal direction of the second rail shaft to expose the second rail shaft therethrough are formed in a remaining surface of the frame.

5 Claims, 13 Drawing Sheets

(56) References Cited

U.S. PATENT DOCUMENTS

| | | | | |
|---|---|---|---|---|
| 2023/0161229 A1* | 5/2023 | Kim | ........................ | H04N 23/57 |
| | | | | 359/824 |
| 2023/0236385 A1* | 7/2023 | Park | ......................... | G02B 7/08 |
| | | | | 359/823 |
| 2023/0350274 A1* | 11/2023 | Jung | ........................ | G03B 17/12 |
| 2024/0329360 A1* | 10/2024 | Osaka | .................... | H04N 23/55 |
| 2024/0345455 A1* | 10/2024 | Song | ........................ | G03B 13/18 |

FOREIGN PATENT DOCUMENTS

| | | | |
|---|---|---|---|
| KR | 10-1518825 | B1 | 5/2015 |
| KR | 10-2303499 | B1 | 9/2021 |
| KR | 10-2023-0152557 | A | 11/2023 |

* cited by examiner (a)　　　(b)　　　(c)　　　(d)　　　(e)　　　(f)

FRAME ASSEMBLY FOR OPTICAL ACTUATOR WITH RAIL SHAFTS AND MANUFACTURING METHOD THEREOF

BACKGROUND OF THE INVENTION

Field of the Invention

The present invention relates to a frame assembly which constitutes a base and/or a carrier moving with respect to the base through a ball in an optical actuator, and a manufacturing method thereof.

Description of the Related Art

Optical modules such as small cameras are often installed as basic items in portable electronic devices, such as smartphones and tablet and notebook computers, drones, vehicles, and the like. An actuator which may implement an autofocus (AF) function to adjust a focal distance with a subject by linearly moving a lens in an optical axis direction is applied to these optical modules.

Korean Patent Registration No. 10-2303499 (hereinafter referred to as "Related Patent") discloses an "optical actuator". According to Related Patent, a magnet (or a coil) is installed on a carrier which is a moving body equipped with a lens, a coil (or a magnet) is installed on a housing which is a fixed body, and electromagnetic force is generated between the coil and the magnet to move the carrier in a direction of an optical axis or in a direction perpendicular to the optical axis. In addition, an appropriate distance between the moving body and the fixed body may be continuously maintained by interposing balls between the moving body and the fixed body, and the carrier may be more flexibly and accurately moved due to frictional force minimized through rotational movement of the balls and point contact with the balls.

However, in the case of Related Patent, whenever the autofocus function or the like is repeatedly implemented, the carrier moves a very short distance at a high speed while maintaining contact with ball bearings, and may receive a strong external shock as falling, and when the carrier is formed of a synthetic resin, a dent is formed on the surface of the carrier or the housing facing the ball bearing due to surface hardness depending on material characteristics, thereby causing problems, such as deterioration of the autofocus function.

Further, a part of the carrier coming into contact with the ball (i.e., a guide rail) may be severely worn, and flow marks or shrinkage formed due to injection molding may have a negative influence on normal operation and durability of a product.

In addition, products are becoming larger and load applied to guide rails is increasing due to recent structural complexity and increase in market demands, and thus, it is necessary to prepare countermeasures against this.

RELATED ART DOCUMENTS

Patent Documents (Patent Document 1) Korean Patent Registration No. 10-2303499

SUMMARY OF THE INVENTION

Therefore, the present invention has been made in view of the above problems, and it is an object of the present invention to provide a frame assembly using a metal shafts applied to a rail which guides movement of a ball, and a manufacturing method thereof.

It is another object of the present invention to provide a frame assembly which allows rail shafts to be installed at accurate positions under an automated injection molding process, and a manufacturing method thereof.

In accordance with one aspect of the present invention, the above and other objects can be accomplished by the provision of a frame assembly applied to an optical actuator including a base and a carrier provided to be movable in an optical axis direction with respect to the base through a ball, the frame assembly being configured to constitute the base or the carrier and including a first rail shaft and a second rail shaft formed of a metal, and a frame formed by injecting a resin into a mold into which the first rail shaft and the second rail shaft are inserted.

At least a part of each of the first rail shaft and the second rail shaft configured to come into contact with the ball is exposed through one surface of the frame, and a plurality of first shaft position alignment holes arranged in a longitudinal direction of the first rail shaft to expose the first rail shaft therethrough and a plurality of second shaft position alignment holes arranged in a longitudinal direction of the second rail shaft to expose the second rail shaft therethrough are formed in a remaining surface of the frame.

The frame may include an upper surface and a lower surface spaced apart from each other in the optical axis direction, and an inner circumferential surface and an outer circumferential surface spaced apart from a direction perpendicular to the optical axis and configured to connect the upper surface and the lower surface. One of the inner circumferential surface and the outer circumferential surface may include the one surface of the frame, and a remaining one may include the remaining surface of the frame, and a pair of shaft position adjustment holes may be formed on at least one of the upper surface and the lower surface at positions corresponding to the first rail shaft and the second rail shaft.

The shaft position adjustment holes may be configured to have a smaller size than a cross section of the first rail shaft or the second rail shaft.

Each of the first shaft position alignment holes and the second shaft position alignment holes may be formed in the one surface of the frame, and may be in a form of a recess having a depth configured not to reach the remaining surface of the frame.

In accordance with another aspect of the present invention, there is provided a manufacturing method of a frame assembly including mounting each of at least one pair of rail shafts formed of a metal on a pair of shaft positioning parts and a shaft fixing part disposed between the pair of shaft positioning parts, by an automated jig, the pair of shaft positioning parts and the shaft fixing part provided in a mold for producing a frame, adjusting positions of the rail shafts in a longitudinal direction in the mold by stoppers, and producing the frame by injecting a molten resin into the mold.

Mounting each of the at least one pair of rail shafts may include bringing each of the at least one pair of the rail shafts into close contact with the pair of shaft positioning parts by applying adsorption force through a passage formed in the shaft fixing part.

Each of the pair of shaft positioning parts may include a guide configured to guide a corresponding one of the at least one pair of the rail shafts to a predetermined position.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, technical ideas described in embodiments of the present invention may be implemented independently or in combination with each other. Reference will be made in detail to various embodiments of the present invention, examples of which are illustrated in the accompanying drawings and described below. While the invention will be described in conjunction with exemplary embodiments, it will be understood that present description is not intended to limit the invention to the exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
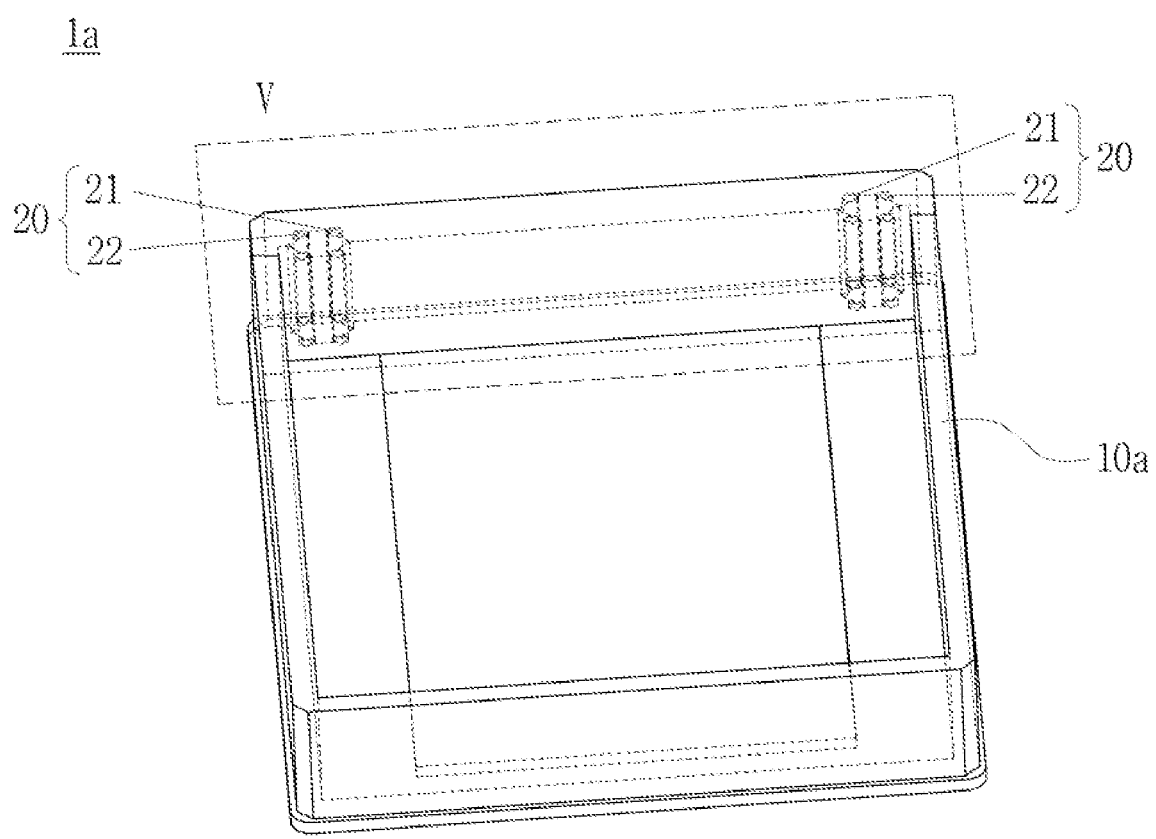
FIG. 1 is a view showing a frame assembly applied to an optical actuator according to a first embodiment.
Figure 2:
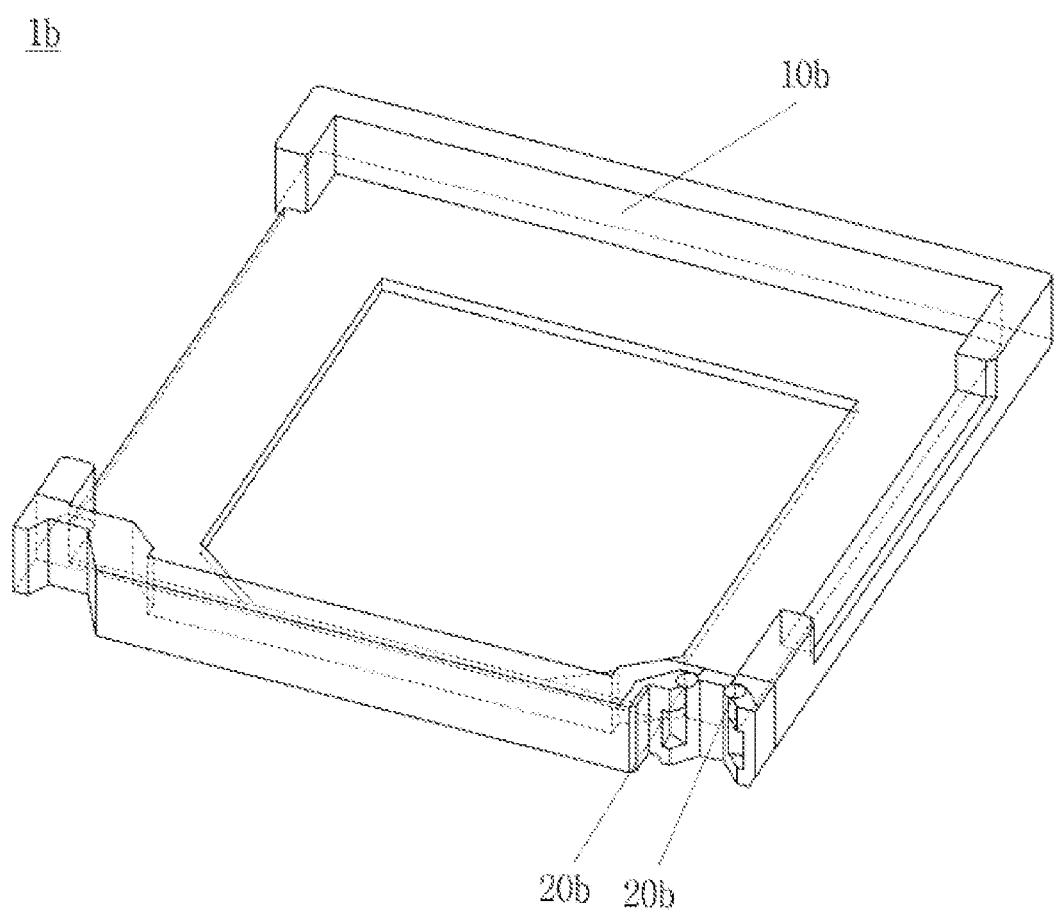
FIG. 2 is a view showing a frame assembly applied to an optical actuator according to a second embodiment.
Figure 3:
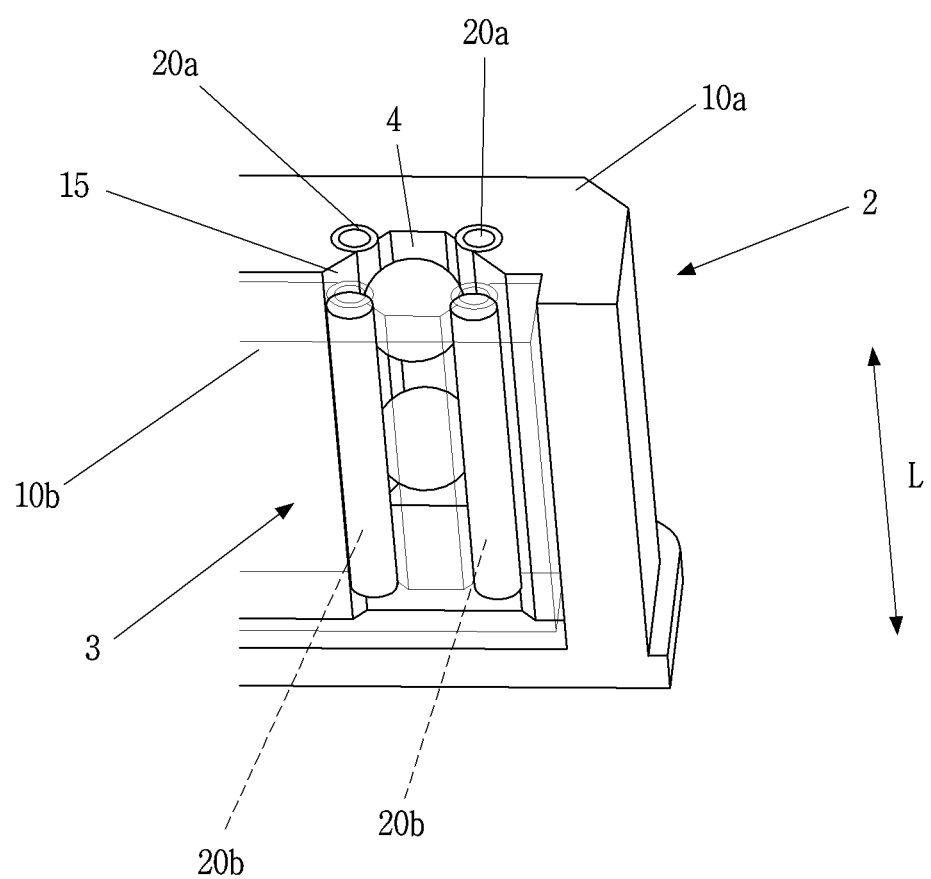
FIG. 3 is a view partially illustrating the optical actuator.
Figure 4:
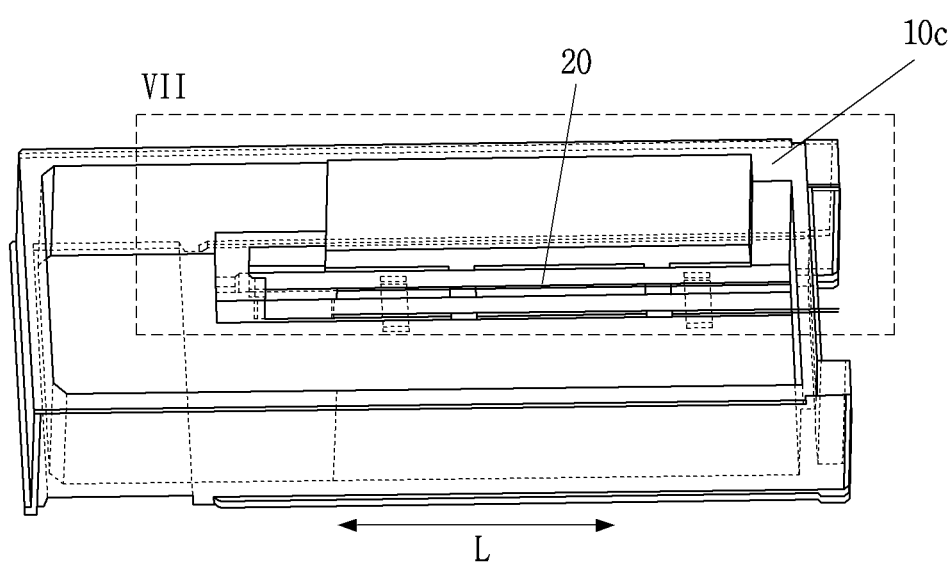
FIG. 4 is a view showing a frame assembly applied to an optical actuator according to a third embodiment.

FIG. 1 is a view showing a frame assembly applied to an optical actuator according to a first embodiment of the present invention. FIG. 2 is a view showing a frame assembly applied to an optical actuator according to a second embodiment of the present invention. FIG. 3 is a view partially illustrating the optical actuator. FIG. 4 is a view showing a frame assembly applied to an optical actuator according to a third embodiment of the present invention. Hereinafter, the frame assemblies will be described with reference FIGS. 1 to 4.

Referring to FIG. 3, an optical actuator to which frame assemblies 1a, 1b and 1c according to embodiments of the present invention are applied includes a base 2, and a carrier 3 provided to be movable in an optical axis direction L with respect to the base 2 through balls 4. Here, the base 2 is defined as a fixed body, and the carrier 3 is defined as a moving body.

Although not shown, a lens and a magnet (or a coil) may be installed on the carrier 3, and a coil (or a magnet) may be installed on the base 2.

The carrier 3 is moved in the optical axis direction L by electromagnetic force acting between the coil and the magnet, rails are provided on each of the base 2 and the carrier 3 so as to ensure smooth movement of the carrier 3, and the balls 4 are disposed between both rails.

When the carrier 3 is moved, the focal length of the lens assembly provided on the carrier 3 also changes, so a continuous zoom function can be achieved. The lens assembly includes at least one lens that moves in an optical axis direction as the carrier 3 moves, and the distance between the lens and the image sensor (CMOS, CCD, etc., not shown) may vary as the carrier 3 moves.

Depending on embodiments, the carrier 3 may be provided to be movable up and down, as shown in FIGS. 1 to 3, and in this case, the optical axis direction L is the vertical direction.

Alternatively, the carrier 3 may be provided to be movable in the horizontal direction, as shown in FIG. 4, and in this case, the optical axis direction L is the horizontal direction, and the at least one lens moves in the optical axis direction, as the carrier 3 moves, to perform continuous zoom function.

The balls 4 are a type of bearing and have a spherical shape. At least one ball 4 is interposed between the moving body and the fixed body, maintains a constant distance between the moving body and the fixed body, and minimizes friction therebetween through rotational movement and point contact with the rails.

The frame assembly 1a, 1b or 1c according to one embodiment of the present invention may constitute the base 2 or the carrier 3.

The frame assembly 1a, 1b or 1c may include a frame 10a, 10b or 10c, and at least one rail 20. Each rail 20 includes a pair of the rail shafts 21 and 22, 20b or 20c formed of a metal. The assembly 1a, 1b or 1c may be formed by injecting a synthetic resin into a mold in the state in which the at least one rail 20 is inserted into the mold.

The rail shafts 21 and 22, 20b or 20c are formed of the metal and have an overall long bar shape, and parts of the rail shafts 21 and 22, 20b or 20c which come into contact with the ball 4 (referred to hereinafter as "ball contact parts") have the same cross-sectional shape at any point.

Figure 8:
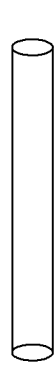
FIG. 8 shows rail shafts according to various embodiments.
Figure 8:
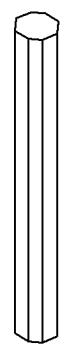
Figure 8:
Figure 8:
Figure 8:
Figure 8:
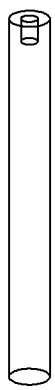

FIGS. 8(a) to 8(f) show rail shafts 21 and 22, 20b or 20c according to various embodiments and, referring to FIGS. 8(a) to 8(f), the ball contact parts of the rail shafts 21 and 22, 20b or 20c may have a circular cross section (in FIG. 8(a)), an octagonal cross section (in FIG. 8(b)), a cross section having a shape in which a portion of a circle is cut by a straight line (in FIG. 8(c)), or a square cross section (in FIG. 8 (d)).

Furthermore, the rail shafts 21 and 22, 20b or 20c may have a protrusion at one end (FIGS. 8 (d) and 8 (e)), or may have a recess at one end (FIG. 8(f)), and in this case, recesses into which the protrusions of the rail shafts 21 and 22, 20b or 20c are inserted may be formed in the frame 10a, 10b or 10c, or protrusions which are inserted into the recesses of the rail shafts 21 and 22, 20b or 20c may be formed on the frame 10a, 10b or 10c.

Figure 5A:
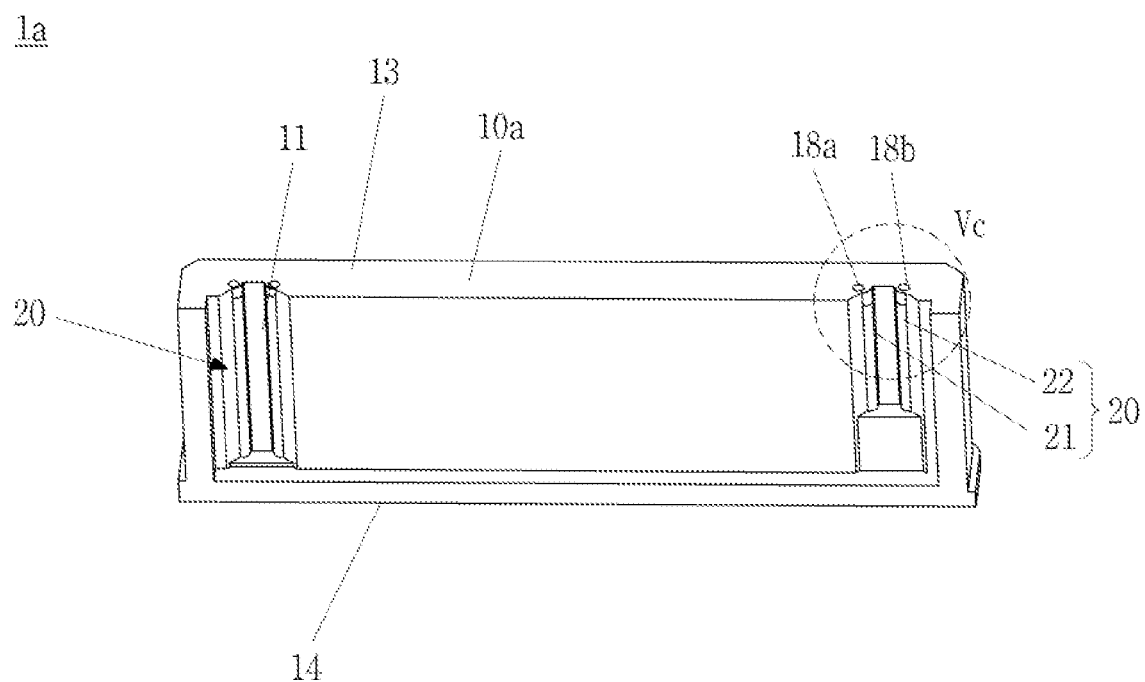
FIG. 5A is a view showing portion V shown in FIG. 1.
Figure 5B:
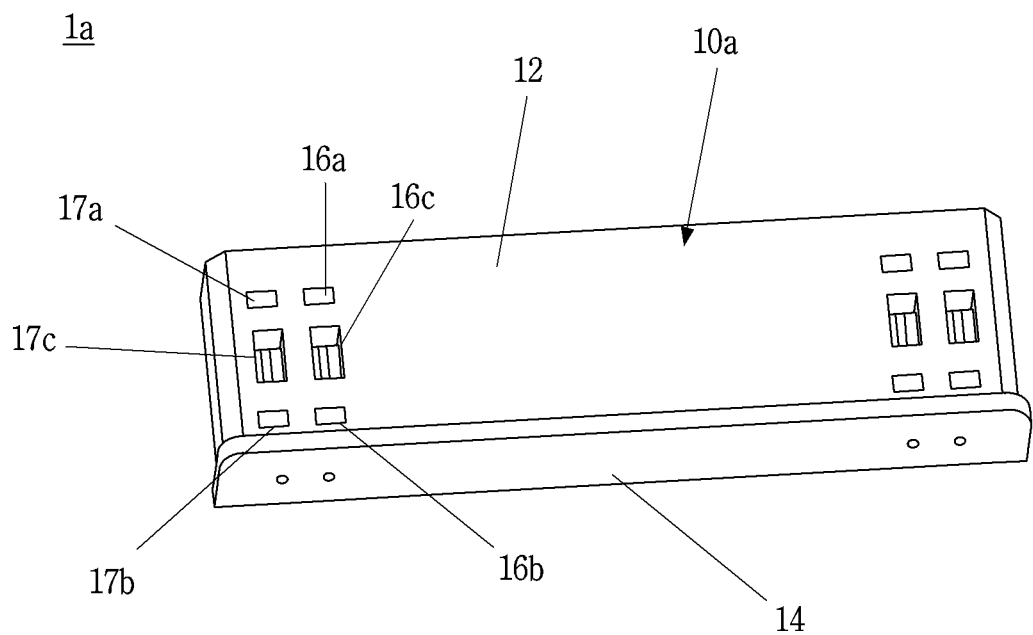
FIG. 5B is a rear view of the portion shown in FIG. 5A.
Figure 5C:
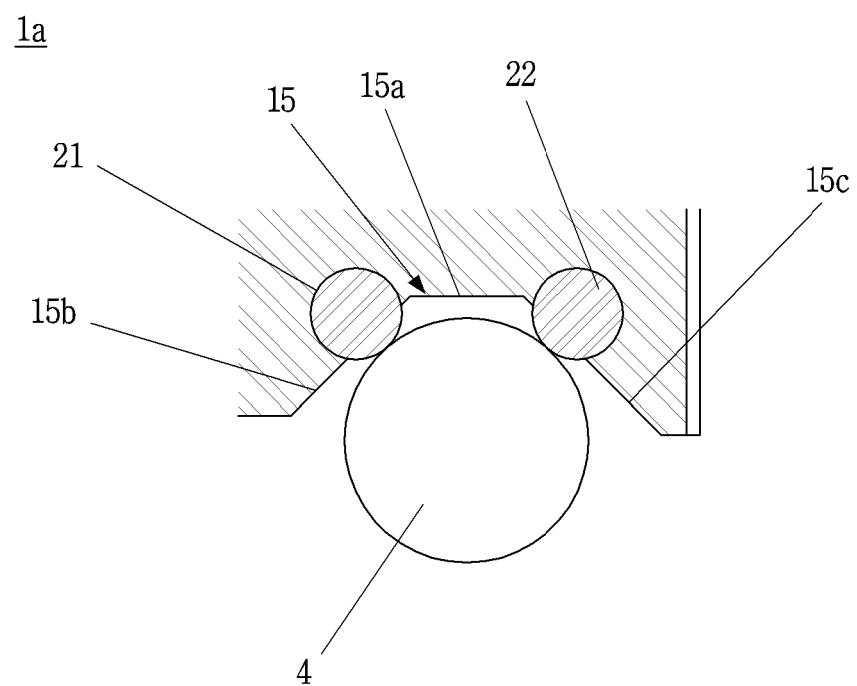
FIG. 5C is a cross-sectional view of portion Vc shown in FIG. 5A.
Figure 6:
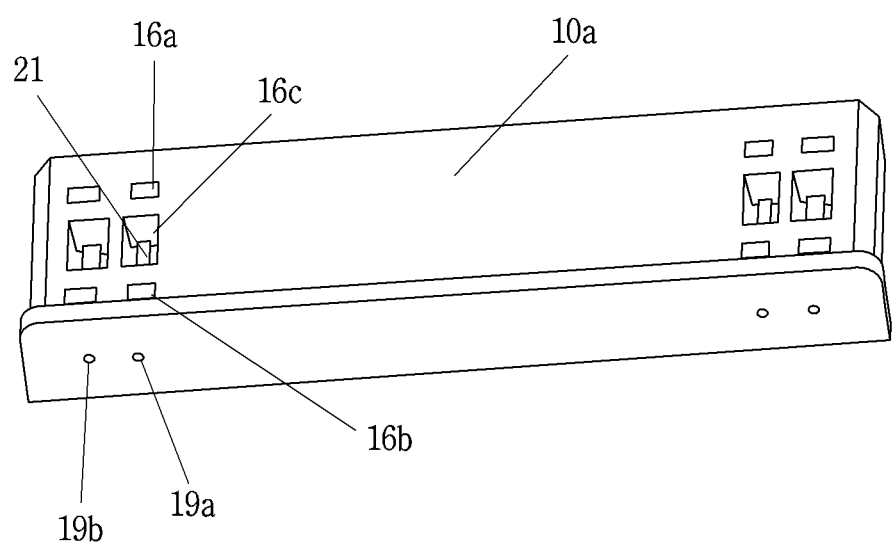
FIG. 6 is a rear view of the portion shown in FIG. 5A according to another embodiment of the present invention.

FIG. 5A is a view showing portion V shown in FIG. 1. FIG. 5B is a rear view of the portion shown in FIG. 5A. FIG. 5C is a cross-sectional view of portion Vc shown in FIG. 5A. FIG. 6 is a rear view of the portion shown in FIG. 5A according to another embodiment of the present invention. Hereinafter, FIGS. 5A to 5C and FIG. 6 will be referred to.

The frame assembly 1a according to one embodiment of the present invention may include at least one rail 20, and the frame 10a formed by performing injection molding in the state in which the at least one rail 20 is inserted into the mold.

The rail 20 may include a first rail shaft 21 and a second rail shaft 22 formed of a metal. The first rail shaft 21 and the second rail shaft 22 extend long in the moving direction of the frame assembly 10a or the optical axis direction L, respectively, and are disposed parallel to each other.

As shown in FIG. 5C, the first rail shaft 21 and the second rail shaft 22 are partially embedded in the frame 10, and a part of each of the first rail shaft 21 and the second rail shaft 22 coming into contact with the ball 4 may be exposed through one surface 11 of the frame 10a, when viewed in cross section. Here, the surface 11 may form the inner circumferential surface of the frame 10a constituting the base 2.

However, depending on embodiments, when the frame assembly 1b constitutes the carrier 3, as shown in FIG. 2, one surface of the frame 10b through which the shafts 20b are exposed may form the outer circumferential surface of the frame 10b.

A guide groove 15 extending long in the optical axis direction L may be formed in the frames 10a, 10b and 10c. The guide groove 15 provides a space in which the ball 4 is installed, and may include a bottom surface 15a, and a first inclined surface 15b and a second inclined surface 15c extending from both sides of the bottom surface 15a in a form in which the distance therebetween gradually increases (with reference to FIG. 5C).

The first rail shaft 21 may be disposed on the first inclined surface 15b, and the second rail shaft 22 may be disposed on the second inclined surface 15c.

Further, at least one first shaft position alignment hole 16a and 16b arranged in the length direction of the first rail shaft 21 and at least one second shaft position alignment hole 17a and 17b arranged in the length direction of the second rail shaft 22 may be formed in the other surface 12 of the frame 10a (with reference to FIG. 5B).

In addition, a first fixing part correspondence hole 16c may be formed in the other surface 12 of the frame 10a between a pair of the first shaft position alignment holes 16a and 16b. Further, a second fixing part correspondence hole 17c may be formed in the other surface 12 of the frame 10b between a pair of the second shaft position alignment holes 17a and 17b.

The first rail shaft 21 may be exposed through the first shaft position alignment holes 16a and 16b. The second rail shaft 22 may be exposed through the second shaft position alignment holes 17a and 17b.

Likewise, a part of the first rail shaft 21 and a part of the second rail shaft 22 may be exposed through the first fixing part correspondence hole 16c and the second fixing part correspondence hole 17c, respectively.

As shown in FIG. 5C, each of the shaft position alignment holes 16a, 16b, 17a and 17b and/or the fixing part correspondence holes 16c and 17c does not completely penetrate from the surface 12 to the surface 11 of the frame 10a, may be provided in the form of a recess having a depth, which does not reach the surface 11 of the frame 10a, and may be provided with an opening formed on the bottom surface of the recess so as to expose the rail shaft 21 or 22.

Figure 9:
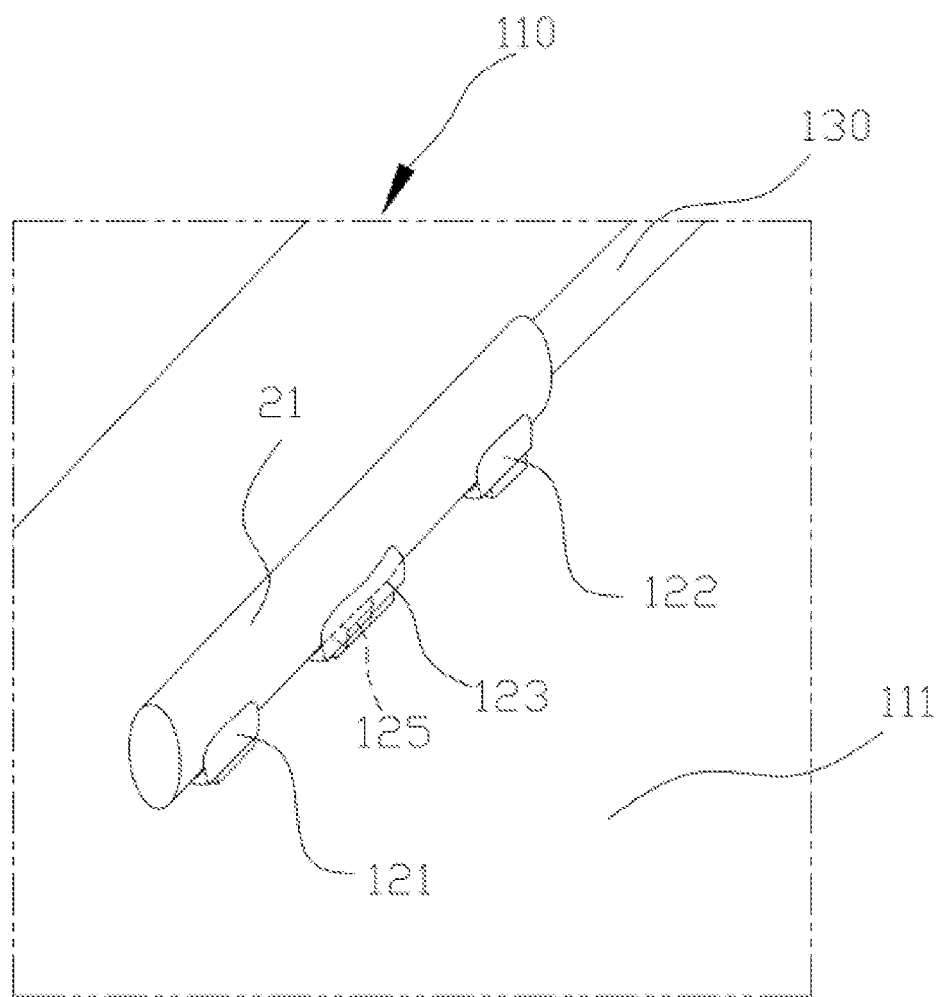
FIG. 9 is a view showing a mold used in a manufacturing method of a frame assembly according to one embodiment of the present invention.

FIG. 9 is a view showing a mold used in a manufacturing method of a frame assembly according to one embodiment of the present invention. Referring to FIG. 9, in a mold 110 to produce the frame 10a, 10b or 10c through injection molding, at least one pair of shaft positioning parts 121 and 122 configured to place the rail shafts 21 and 21 at predetermined points within the mold 110 may be formed. The shaft positioning parts 121 and 122 may be in the form of protrusions protruding from an inner surface 111 of the mold 110.

The pair of shaft positioning parts 121 and 122 may be spaced apart in the longitudinal direction of the rail shafts 21 and 22, and the respective shaft positioning parts 121 and 122 serve to maintain the rail shafts 21 and 22 at the predetermined positions or postures through close contact with the rail shafts 21 and 22.

Each of the respective shaft positioning parts 121 and 122 may include a guide (not shown) configured to guide a corresponding one of the rail shafts 21 and 22 to the predetermined position or posture, when the corresponding rail shaft 21 or 22 is in close contact with the shaft positioning parts 121 and 122, that is, when the corresponding rail shaft 21 or 22 is in close contact with the shaft positioning parts 121 and 122 by suction force or magnetic force, which will be described below. The guide includes an inclined surface configured to guide movement of the corresponding rail shaft 21 or 22 to the predetermined position, and a position maintenance unit, such as a recess, configured to receive, be engaged with, or be combined with at least a part of the corresponding rail shaft 21 or 22 at the predetermined position.

Meanwhile, the pair of shaft positioning parts 121 and 122 may respectively support two parts of the corresponding rail shaft 21 or 22 spaced apart from each other in the axial direction of the rail shafts 21 and 22, and thereby, two position alignment holes 16a and 16b or 17a and 17b are formed corresponding to one rail shaft 21 or 22, as shown in FIG. 5B.

Figure 7A:
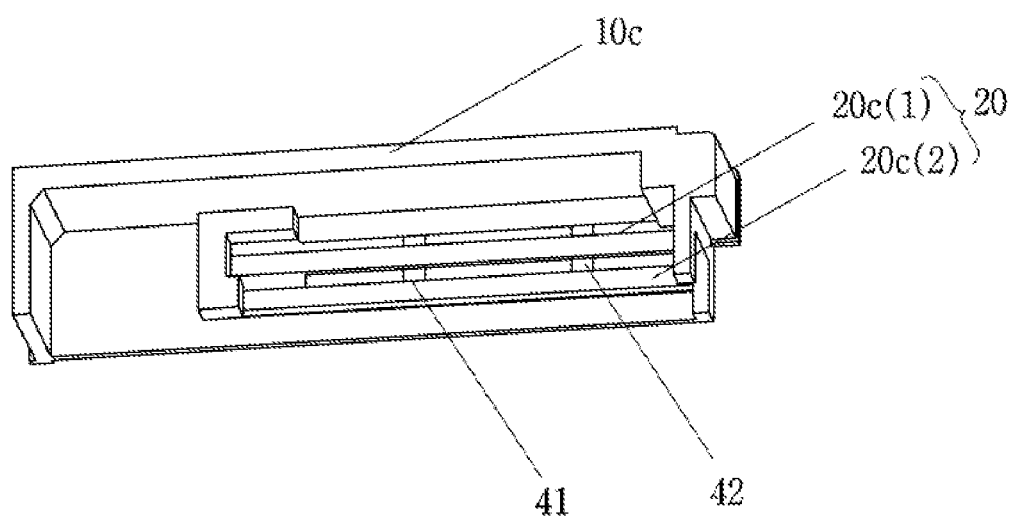
FIG. 7A is a view showing portion VII shown in FIG. 4.
Figure 7B:
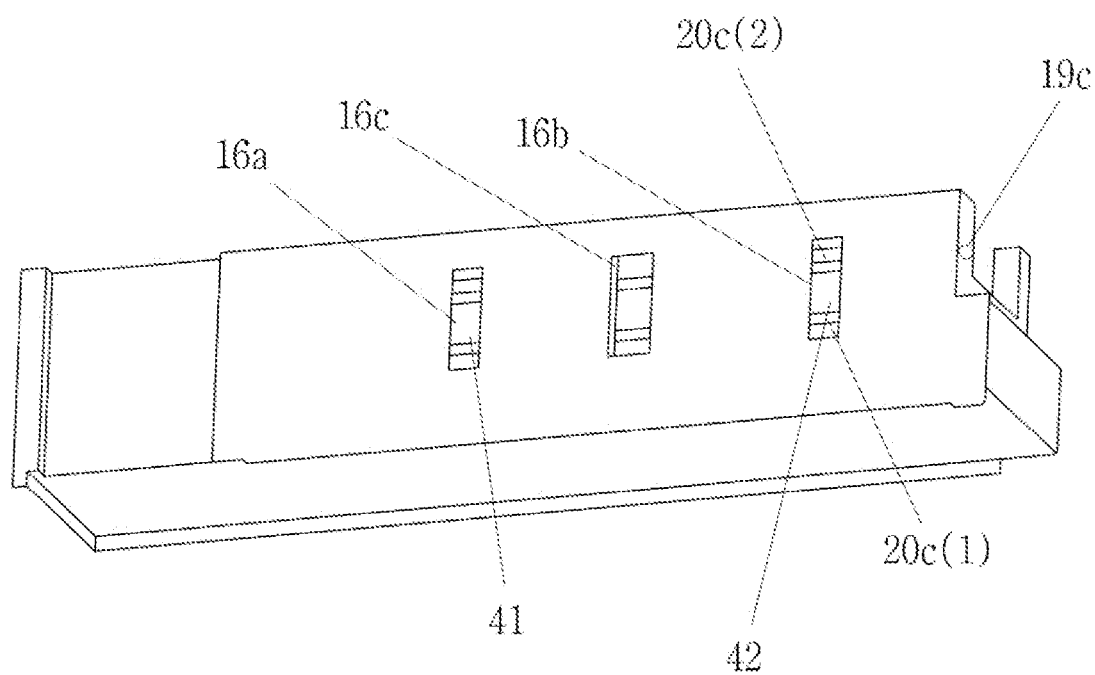
FIG. 7B is a rear view of the portion shown in FIG. 7A.

Depending on embodiments, a pair of the shaft positioning parts 121 and 122 may be provided with respect to a pair of rail shafts 20c(1) and 20c(2), and in this case, as shown in FIG. 7B, two position alignment holes 16a and 16b are formed corresponding to a pair of the rail shafts 20c(1) and 20c(2).

The mold 110 may further include a shaft fixing part 123 disposed between the pair of shaft positioning parts 121 and 122. The shaft fixing part 123 is in the form of a protrusion protruding from the inner surface 111 of the mold 110, and supports the corresponding rail shaft 21 or 22.

A passage 125 through which suction force or adhesive force to cause the corresponding rail shaft 21 or 22 to come into close contact with the shaft fixing part 123 is applied may be formed in the shaft fixing part 123. A separate vacuum device (e.g., a vacuum pump) is provided, suction force or negative pressure from the vacuum device may be applied to the corresponding rail shaft 21 or 22 through the passage 125, and thereby, the corresponding rail shaft 21 or 22 is fixed to the shaft fixing part 123 and, at the same time, comes into close contact with the above-described pair of the shaft positioning parts 121 and 122, and is thus disposed in the predetermined position or posture.

Depending on embodiments, the corresponding rail shaft 21 or 22 may be fixed to the shaft fixing part 123 using magnetic force, and in this case, a magnet of a grip may pass through the passage 125.

The position alignment holes 16a, 16b, 17a and 17b may be formed in the frame 10a so as to correspond to the shaft positioning parts 121 and 122. That is, spaces occupied by the shaft positioning parts 121 and 122 within the mold 110 are not filled with an injected resin and thus form cavities, and thereby, the position alignment holes 16a, 16b, 17a and 17b are formed.

In the same manner, the fixing part correspondence holes 16c and 17c may be formed in the frame 10a so as to correspond to the shaft fixing parts 123. That is, spaces occupied by the shaft fixing parts 123 within the mold 110 are not filled with the injected resin and thus form cavities, and thereby, the fixing part correspondence holes 16c and 17c are formed.

The frame 10a may include an upper surface 13 and a lower surface 14 spaced apart from each other in the optical axis direction L, and an inner circumferential surface 11 and an outer circumferential surface 12 spaced apart from a direction perpendicular to the optical axis and connecting the upper surface 13 and the lower surface 14.

Position adjustment holes 18a and 18b and/or 19a and 19b configured to expose ends of the first rail shaft 21 and the second rail shaft 22 may be formed in at least one of the upper surface 13 and the lower surface 14 of the frame 10a.

At least a portion of each of the ends of the rail shafts 21 and 22 may be seen through the position adjustment holes 18a and 18b and/or 19a and 19b. The position adjustment holes 18a and 18b and/or 19a and 19b may be formed to have a smaller size than the cross sections of the ends of the rail shafts 21 and 22. In this case, the rail shafts 21 and 22 may not pass through the position adjustment holes 18a and 18b and/or 19a and 19b, and may thus be firmly fixed within the frame 10a.

FIG. 7A is a view showing portion VII shown in FIG. 4. FIG. 7B is a rear view of the portion shown in FIG. 7A. The frame assembly 1c according to one embodiment of the present invention may be applied to an actuator in which a carrier is moved in the horizontal direction.

The frame assembly 1c may include at least one rail 20, and a frame 10c formed by inserting the at least one rail 20 into a mold and injecting a resin into the mold.

The at least one rail 20 may include a pair of the rail shafts 20c(1) and 20c(2) extending in the horizontal direction and arranged parallel to each other.

Rail shaft fixing parts 41 and 42 in which the pair of rail shafts 20c(1) and 20c(2) is partially embedded may be formed on the inner circumference of the frame 10c.

At least one position alignment hole 16a or 16b may be formed in the outer circumferential surface of the frame 10c. A structure in which parts of the rail shafts 20c(1) and 20c(2) are exposed through the at least one position alignment hole 16a or 16b is substantially the same as those of the above-described embodiments, but this embodiment differs from the above-described embodiments in that the two rail shafts 20c(1) and 20c(2) are exposed together through one position alignment hole.

A position adjustment hole 19c through which one end of the first rail shaft 20c(1) and one end of the second rail shaft 20c(2) are exposed may be formed in one side surface of the frame 10c. Although this embodiment is configured such that the positions of the two rail shafts 20c(1) and 20c(2) are adjusted through one position adjustment hole 19c, respective position adjustment holes for the rail shafts 20c(1) and 20c(2) may be provided as in the above-described embodiments.

Figure 10:
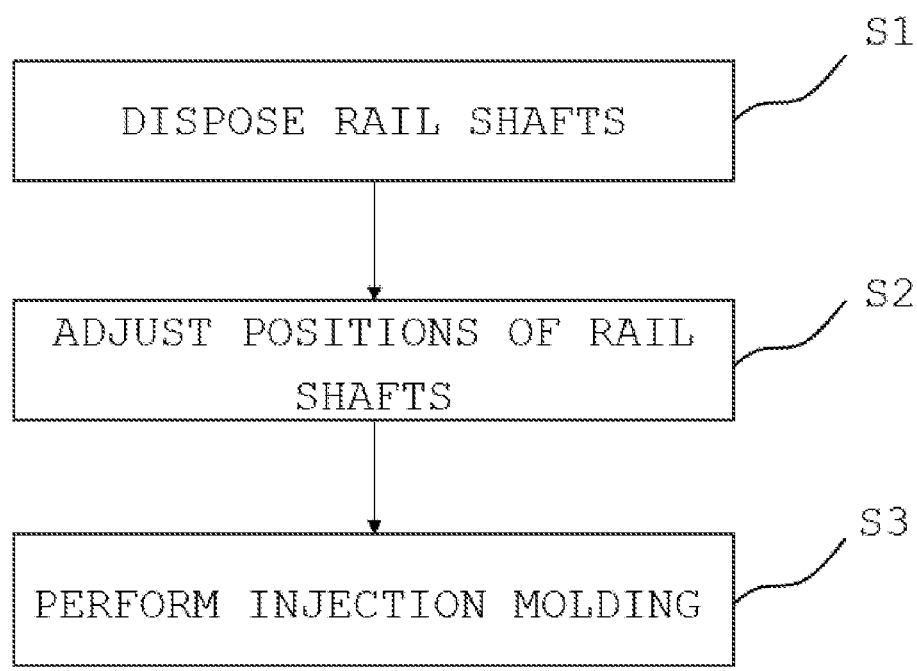
FIG. 10 is a flowchart showing the manufacturing method of the frame assembly according to one embodiment of the present invention.

FIG. 10 is a flowchart showing the manufacturing method of the frame assembly according to one embodiment of the present invention. Hereinafter, the manufacturing method of the frame assembly according to one embodiment of the present invention will be described with reference to FIG. 10.

The manufacturing method of the frame assembly according to one embodiment of the present invention includes disposing rail shafts (Si), adjusting the positions of the rail shafts (S2), and performing injection molding (S3).

In disposing the rail shafts (S1), at least one pair of rail shafts 21 and 22 formed of a metal is placed in a mold by an automated jig. The automated jig may include a transport mechanism, such as a robot arm, and a jig or a grip provided on the transport mechanism to hold the rail shafts 21 and 22. The jig may be configured to hold the rail shafts 21 and 22 using vacuum adsorption or magnetic force. Here, vacuum adsorption force may be provided through the passage 125 formed in the shaft fixing part 123.

As described above, at least one pair of shaft positioning units 121 and 122 for each of the rail shafts 21 or 22 may be provided in the mold.

The transport mechanism may transport the rail shafts 21 and 22 to predetermined positions depending on a programmed algorithm. For example, the transport mechanism may be controlled so that each of the shafts 21 and 22 is placed on a pair of the shaft positioning units 121 and 122 and the shaft fixing part 123.

In adjusting the positions of the rail shafts (S2), the positions of the rail shafts 21 and 22 in the axial direction are adjusted in the state in which the rail shafts 21 and 22 are placed on the shaft fixing parts 123 and the shaft positioning parts 121 and 122, respectively.

Stoppers 130 configured to adjust the positions of the rail shafts 21 and 22 in the axial direction (or the longitudinal direction) may be provided in the mold 110. The stoppers 130 may be fixedly placed in the mold 110 to limit or restrain movement of the rail shafts 21 and 22, or may be provided to be movable in the axial direction L with respect to the mold 110 and may come into contact with or be separated from the ends of the rail shafts 21 or 22 to finely adjust the positions of the rail shafts 21 and 22. The stoppers 130 may have a shape extending long in one direction, such as a pin, a rod, or a protrusion, and the position adjustment holes 18a and 18b or 19a and 19b formed in the frame 10a, 10b or 10c correspond to the stoppers 130, and are formed by cavities created when spaces occupied by the stoppers 130 in the mold 110 are not filled by an injected resin.

Performing the injection molding (S3) may include closing the mold 110 and injecting a molten resin into the mold 110 in the state in which the rail shafts 21 and 22 are positioned in place, and opening the mold 110 and separating the frame assembly 1a, 1b or 1c from the mold 110 after hardening the injected resin.

As is apparent from the above description, a frame assembly and a manufacturing method thereof according to the present invention exhibit the effect of improving wear resistance and extending the lifespans of parts because a rail coming into contact with a ball includes rail shafts formed of a metal.

Further, since a sufficient level of straightness is secured by the rail shafts, driving vibration of an actuator may be prevented and precise operation of the actuator is possible.

In addition, the frame assembly and the manufacturing method thereof according to the present invention may precisely control disposition of the rail shafts in a mold, thereby exhibiting the effect of lowering a product defect rate and improving quality of a product.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A frame assembly applied to an optical actuator comprising a base and a carrier provided to be movable in an optical axis direction with respect to the base through a ball, the frame assembly being configured to constitute the base or the carrier and comprising:
   a first rail shaft and a second rail shaft formed of a metal, respectively; and
   a frame formed by injecting a resin into a mold into which the first rail shaft and the second rail shaft are inserted, wherein:
   at least a part of each of the first rail shaft and the second rail shaft configured to come into contact with the ball is exposed through one surface of the frame; and
   a plurality of first shaft position alignment holes arranged in a longitudinal direction of the first rail shaft to expose the first rail shaft therethrough and a plurality of second shaft position alignment holes arranged in a longitudinal direction of the second rail shaft to expose the second rail shaft therethrough are formed in a remaining surface of the frame,
   wherein the frame comprises an upper surface and a lower surface spaced apart from each other in the optical axis direction, and an inner circumferential surface and an outer circumferential surface spaced apart from a direction perpendicular to the optical axis and configured to connect the upper surface and the lower surface,
   wherein one of the inner circumferential surface and the outer circumferential surface comprises the one surface of the frame, and a remaining one comprises the remaining surface of the frame,
   wherein each of the first shaft position alignment holes and the second shaft position alignment holes is in a form of a recess on the remaining surface or the frame having a depth configured not to reach the one surface of the frame and an opening is formed on a bottom surface of the recess so as to expose the first and second rail shafts, respectively.

2. The frame assembly according to claim 1,
   wherein a pair of shaft position adjustment holes is formed on at least one of the upper surface and the lower surface at positions corresponding to the first rail shaft and the second rail shaft.

3. The frame assembly according to claim 2, wherein the shaft position adjustment holes are configured to have a smaller size than a cross section of the first rail shaft or the second rail shaft.

4. The frame assembly according to claim 1, wherein a first fixing part correspondence hole is formed in the remaining surface of the frame between a pair of the first shaft position alignment holes, and a second fixing part correspondence hole is formed in the remaining surface of the frame between a pair of the second shaft position alignment holes,
   wherein a part of the first rail shaft and a part of the second rail shaft is exposed through the first fixing part correspondence hole and the second fixing part correspondence hole, respectively.

5. A manufacturing method of a frame assembly comprising:
   mounting each of at least one pair of rail shafts formed of a metal on a pair of shaft positioning parts and a shaft fixing part disposed between the pair of shaft positioning parts, by an automated jig, the pair of shaft positioning parts and the shaft fixing part provided in a mold for producing a frame;
   adjusting positions of the rail shafts in a longitudinal direction in the mold by stoppers;
   producing the frame by injecting a molten resin into the mold, wherein:
   mounting each of the at least one pair of rail shafts comprises bringing each of the at least one pair of the rail shafts into close contact with the pair of shaft positioning parts by applying adsorption force through a passage formed in the shaft fixing part; and
   each of the pair of shaft positioning parts comprises a guide configured to guide a corresponding one of the at least one pair of the rail shafts to a predetermined position; and
   opening the mold and separating the frame with the at least one pair of rail shafts from the mold after hardening the injected resin, thereby forming a pair of shaft position alignment holes corresponding to the pair of shaft positioning parts and a fixing part correspondence hole corresponding to the shaft fixing part.

* * * * *